(12) United States Patent
Mori

(10) Patent No.: US 7,854,464 B2
(45) Date of Patent: Dec. 21, 2010

(54) SUN VISOR APPARATUS FOR VEHICLE

(75) Inventor: Keiji Mori, Kariya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 16 days.

(21) Appl. No.: 12/292,097

(22) Filed: Nov. 12, 2008

(65) Prior Publication Data

US 2009/0134656 A1 May 28, 2009

(30) Foreign Application Priority Data

Nov. 13, 2007 (JP) ............................ 2007-294524

(51) Int. Cl.
*B60J 3/02* (2006.01)
(52) U.S. Cl. .................... 296/97.4; 296/97.11
(58) Field of Classification Search ..... 296/97.1–97.11, 296/216.04, 216.05
See application file for complete search history.

(56) References Cited

U.S. PATENT DOCUMENTS

| | | | | |
|---|---|---|---|---|
| 4,674,789 A | * | 6/1987 | Watjer et al. ................ | 296/97.1 |
| 4,929,014 A | * | 5/1990 | Clark et al. ................ | 296/97.8 |
| 4,988,139 A | * | 1/1991 | Yamada ...................... | 296/97.2 |
| 5,040,839 A | * | 8/1991 | Moore ........................ | 296/97.4 |
| 5,076,633 A | * | 12/1991 | Hsu et al. ................... | 296/97.4 |
| 5,192,110 A | * | 3/1993 | Mykytiuk et al. .......... | 296/97.8 |
| 5,292,168 A | * | 3/1994 | Mykytiuk et al. .......... | 296/97.8 |
| 5,443,300 A | * | 8/1995 | Mohammed ................ | 296/97.4 |
| 5,651,605 A | * | 7/1997 | Corn .......................... | 362/492 |
| 6,406,086 B2 | * | 6/2002 | Bauer et al. ................ | 296/97.4 |
| 6,536,829 B2 | * | 3/2003 | Schlecht et al. ............ | 296/97.4 |
| 6,682,122 B1 | * | 1/2004 | Prokhorov .................. | 296/97.8 |
| 7,108,307 B1 | * | 9/2006 | Sahara et al. ............... | 296/97.4 |
| 7,140,663 B1 | * | 11/2006 | Thacker ...................... | 296/97.4 |
| 7,216,917 B2 | * | 5/2007 | Tadakamalla ............... | 296/97.4 |
| 7,347,480 B2 | * | 3/2008 | Lee ............................. | 296/97.4 |
| 2002/0033614 A1 | * | 3/2002 | Quapil ........................ | 296/97.4 |
| 2004/0155489 A1 | * | 8/2004 | Kawasaki .................... | 296/214 |
| 2009/0072574 A1 | * | 3/2009 | Tominaga et al. .......... | 296/97.4 |
| 2009/0278375 A1 | * | 11/2009 | Baudouin ................... | 296/97.8 |
| 2009/0315361 A1 | * | 12/2009 | Glaser ........................ | 296/97.8 |

FOREIGN PATENT DOCUMENTS

| | | |
|---|---|---|
| EP | 1495 889 | 12/2005 |
| JP | 2005-219627 | 8/2005 |
| JP | 2006-335300 | 12/2006 |
| JP | 2007-55512 | 3/2007 |

* cited by examiner

*Primary Examiner*—Glenn Dayoan
*Assistant Examiner*—Gregory Blankenship
(74) *Attorney, Agent, or Firm*—Finnegan, Henderson, Farabow, Garrett & Dunner, LLP

(57) ABSTRACT

A sun visor apparatus for a vehicle includes a sun visor body, a supporting member supported on a roof panel and supporting the sun visor body so that the sun visor body moves in a longitudinal direction of the vehicle between a first position where the sun visor body is positioned in a storage space provided on an underside of the roof panel and a second position where a rear end of the sun visor body is positioned behind a mirror body of an interior rearview mirror when viewed from a driver, and a shade extending from the sun visor body to the storage space in accordance with a movement of the sun visor body.

3 Claims, 10 Drawing Sheets

11: Roof panel
12: Main body
14: Windshield
15: Interior rearview mirror
51: Retractor (retracting member)
52: Roller shade 11: Roof panel
12: Main body
14: Windshield
15: Interior rearview mirror
51: Retractor (retracting member)
52: Roller shade

US 7,854,464 B2

SUN VISOR APPARATUS FOR VEHICLE

CROSS REFERENCE TO RELATED APPLICATIONS

This application is based on and claims priority under 35 U.S.C. §119 to Japanese Patent Application 2007-294524, filed on Nov. 13, 2007, the entire content of which is incorporated herein by reference.

FIELD OF THE INVENTION

The present invention generally relates to a sun visor apparatus for a vehicle.

BACKGROUND

Various kinds of sun visor apparatuses have been developed for vehicles including automobiles in JP2005-219627A, EP1495889, JP2006-335300 (paragraphs [0038] to [0044] and FIGS. 8 to 12) and JP2007-55512.

According to such sun visor apparatuses for vehicles, a sun visor body of the sun visor apparatus for providing shading is supported by a roof panel and positioned in front of an interior rearview mirror when viewed from a driver/passenger view point, that is, the sun visor body of the sun visor apparatus is positioned closer to a rear side of the vehicle than the rearview mirror is. In other words, the sun visor body of the sun visor apparatus is positioned closer to a driver. Consequently, the sun visor body of the sun visor apparatus needs to be small in size in order not to block the interior rearview mirror from the view point of the driver, and thus an area shaded by the sun visor is reduced in terms of both a driver seat and a passenger seat.

A need thus exists for a sun visor apparatus for a vehicle which is not susceptible to the drawback mentioned above.

SUMMARY OF THE INVENTION

According to an aspect of the present invention, a sun visor apparatus for a vehicle includes a sun visor body, a supporting member supported on a roof panel and supporting the sun visor body so that the sun visor body moves in a longitudinal direction of the vehicle between a first position where the sun visor body is positioned in a storage space provided on an underside of the roof panel and a second position where a rear end of the sun visor body is positioned behind a mirror body of an interior rearview mirror when viewed from a driver, and a shade extending from the first position to the second position in accordance with a movement of the sun visor body.

BRIEF DESCRIPTION OF THE DRAWINGS

The foregoing and additional features and characteristics of the present invention will become more apparent from the following detailed description considered with the reference to the accompanying drawings, wherein:

FIG. 1 is a perspective view viewed from an outside of a vehicle and illustrating an upper structure of the vehicle to which a sun visor apparatus according to an embodiment of the present invention is applied to;

FIG. 2 is a perspective view viewed from an inside of the vehicle and illustrating the upper structure of the vehicle to which the sun visor apparatus according to the embodiment of the present invention is applied to;

DETAILED DESCRIPTION

An embodiment of the present invention will be explained with reference to the attached drawings.

Figure 1:
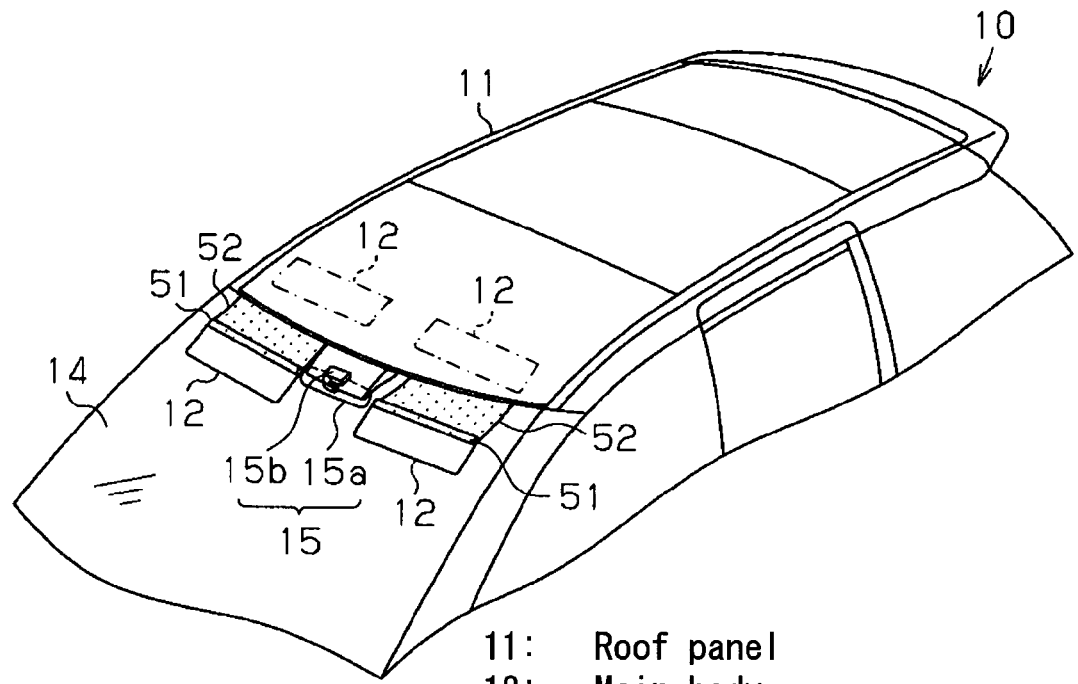
Figure 2:
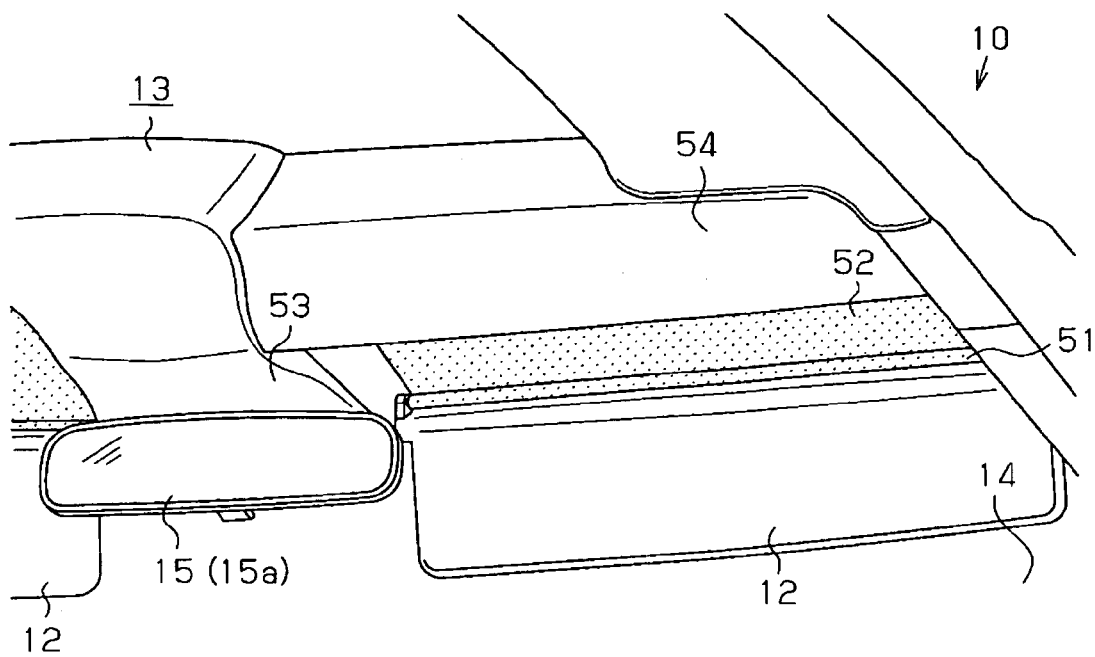

As shown in FIGS. 1 and 2, a sun visor apparatus according to an embodiment of the present invention is provided on a front portion of a roof panel 11 forming a roof portion of a vehicle 10, and includes a pair of sun visor bodies 12, 12 each substantially shaped in a rectangular plate and positioned above a driver seat and a passenger seat respectively. The roof panel 11 includes on an underside thereof a storage space 13 serving as part of a molded ceiling. An interior rearview mirror 15 is attached to a windshield 14 that is adjacent to a front end portion of the roof panel 11. The interior rearview mirror 15 includes a mirror body 15a and an attaching portion 15b. The mirror body 15a has a box-like shape and includes a mirror. The attaching portion 15b is shaped in a substantial bow and attaches the mirror body 15a to the windshield 14. The interior rearview mirror 15 may be attached to a roof inner panel, a dashboard or the like, instead of, as shown in FIGS. 1 and 2, on the windshield 14. Each of the sun visor bodies 12, 12 is movably supported in a longitudinal direction of the vehicle between a predetermined position (a first position) where the sun visor body 12 is positioned and stored in the storage space 13, and another predetermined position (a second position) where a rear end of the sun visor body 12 is positioned behind the mirror body 15a (the interior rearview mirror 15) when viewed from a driver, that is, the rear end of the sun visor body 12 is positioned closer to a front side of the vehicle than the mirror body 15a (the interior rearview mirror 15) is.

Figure 3:
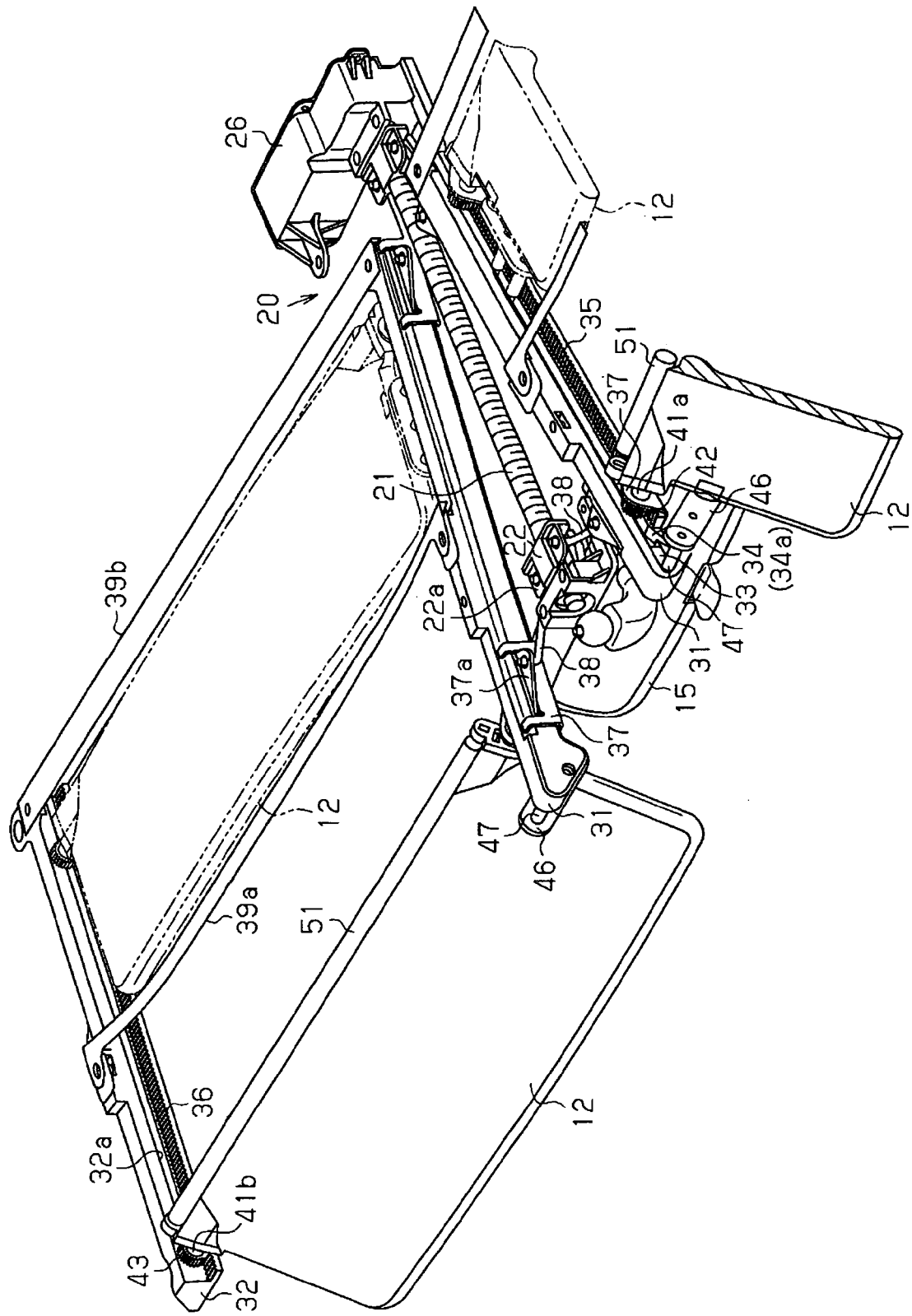
FIG. 3 is a perspective view illustrating the sun visor apparatus according to the embodiment of the present invention.
Figure 4:
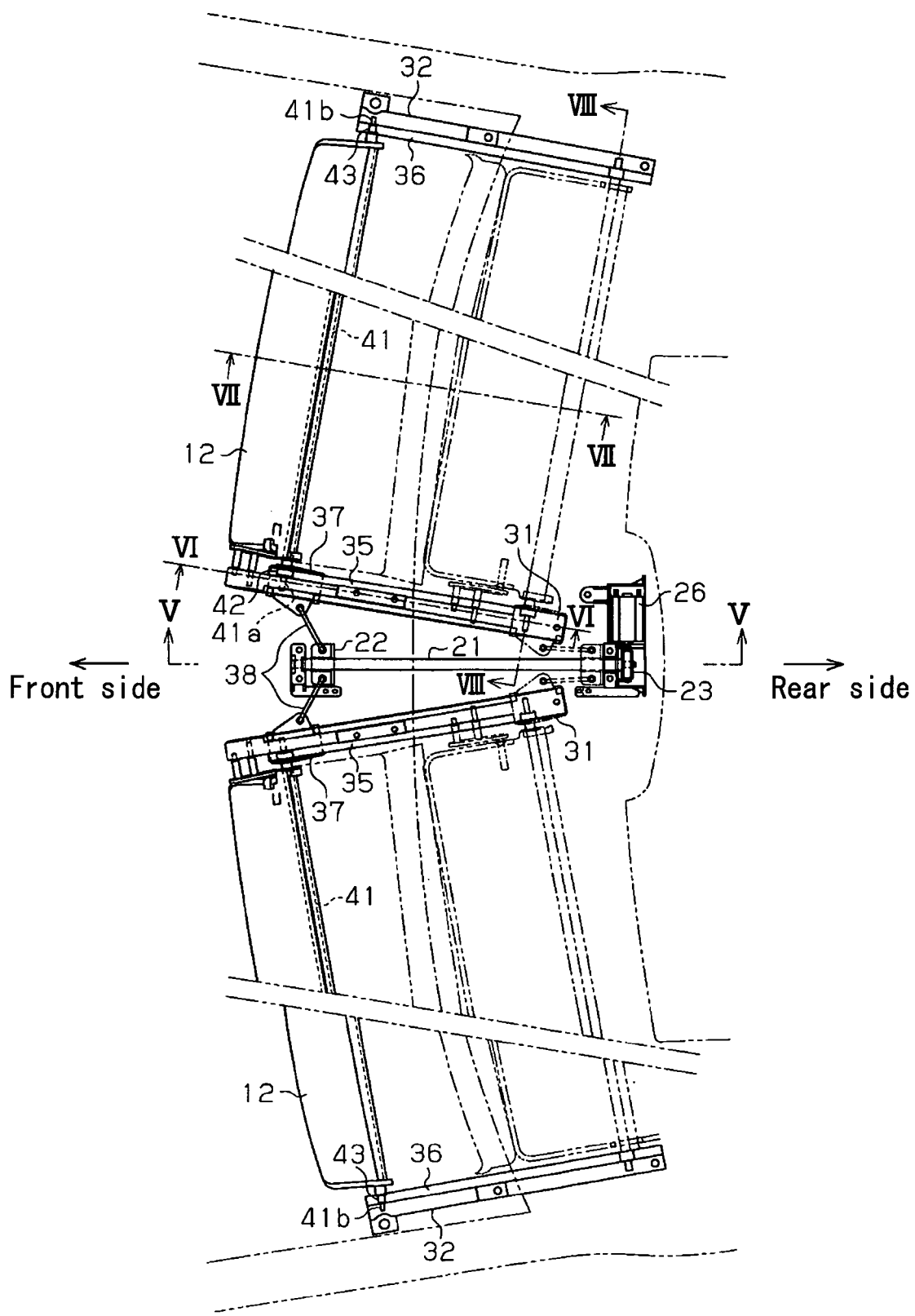
FIG. 4 is an elevation plan view viewed from a direction of arrow E of FIG. 5, which illustrates the sun visor apparatus according to the embodiment of the present invention.
Figure 5:
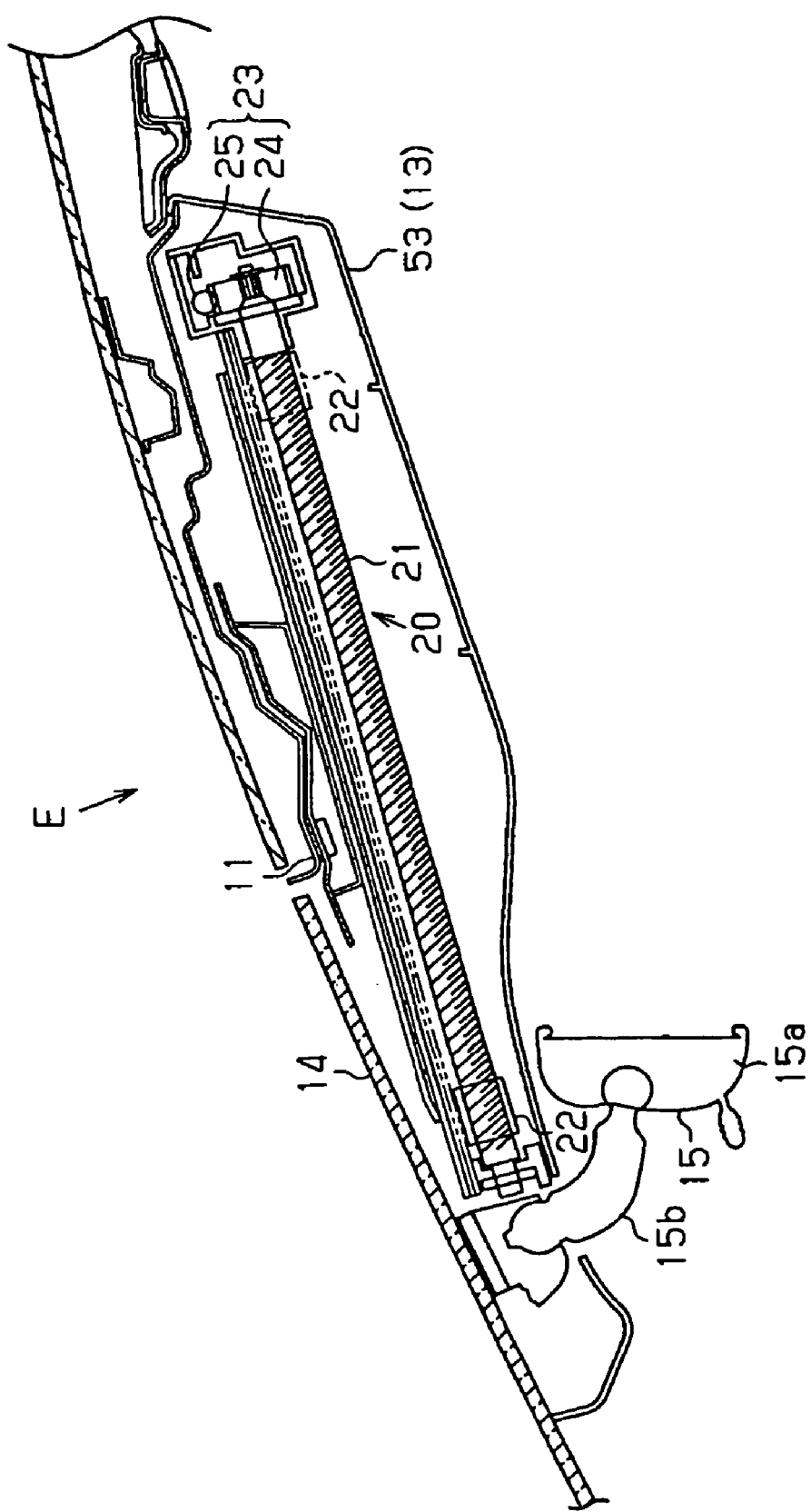
FIG. 5 is a cross-sectional view taken on line V-V of FIG. 4.

As shown in FIGS. 3 to 5, a screw shaft 21 in a round-bar shape is supported on a lower surface of the roof panel 11, more specifically, in a center portion of a width direction of the vehicle. The screw shaft 21 extends in the longitudinal direction of the vehicle and both ends thereof are rotatable but non-movable in an axial direction of the screw shaft 21. Further, a nut member 22 having a block-like shape and threaded onto the screw shaft 21 is supported on the lower surface of the roof panel 11 so as to be movable in the axial direction of the screw shaft 21 but non-rotatable. Accordingly, when the screw shaft 21 is rotated with respect to the nut member 22, the nut member 22 moves along the axis of the screw shaft 21 in the longitudinal direction of the vehicle by a screw mechanism. A front end portion of the screw shaft 21 in the longitudinal direction of the vehicle reaches near an attaching position 15 of the interior rearview mirror 15 (the attaching portion 15b), by extending beyond a rear end, i.e. an upper end, of the windshield 14 in the longitudinal direction of the vehicle (refer to FIG. 5).

A worm wheel 24 co-rotatably connected to a rear end of the screw shaft 21 and a worm 25 meshing with the worm wheel 24 make up a worm gear set 23. The worm 25 is fixedly connected to a rotation axis of an electric motor 26 attached to the roof panel 11. The electric motor 26 serves as a drive member. Consequently, the nut member 22 moves along the axis of the screw shaft 21 in the longitudinal direction of the vehicle when the screw shaft 21 is driven and rotated by the electric motor 26 via the worm gear set 23.

Each of the sun visor bodies 12, 12 positioned on a driver seat side and a passenger seat side respectively is movably supported by a pair of guide rails 31 and 32 in the longitudinal direction of the vehicle. The pair of guide rails 31 and 32 serving as a pair of supporting members, each of which is substantially square bar-shaped and fixedly mounted on the lower surface of the roof panel 11, extends behind the mirror body 15a (the attaching portion 15b) when viewed from the driver/passenger view point. Each of frames 39a and 39b extends in the width direction of the vehicle and is provided on the pair of guide rails 31 and 32 so as to bridge the guide rails 31 and 32 in longitudinally intermediate portions and rear portions thereof. Consequently, the guide rails 31 and 32 are arranged in parallel to each other allowing a fixed distance therebetween in the width direction of the vehicle.

Figure 6:
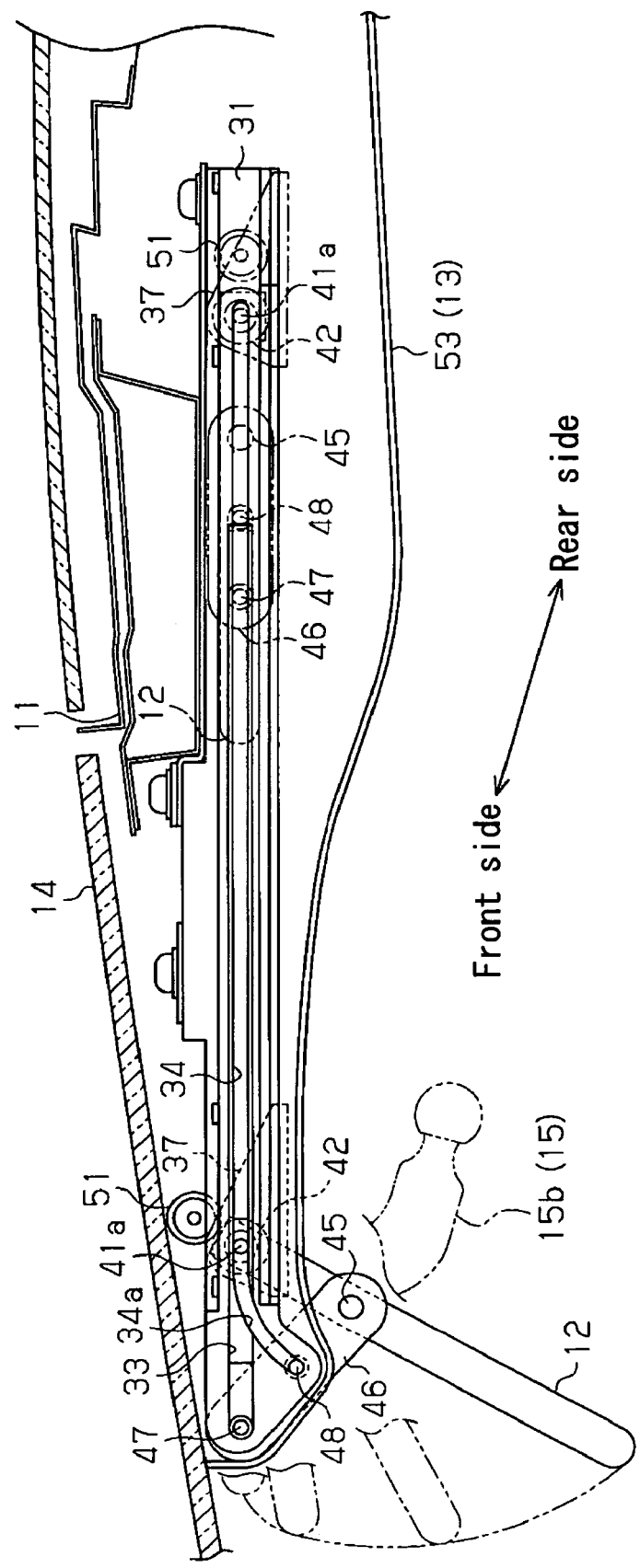
FIG. 6 is a cross-sectional view taken on line VI-VI of FIG. 4.

The pair of guide rails 31 and 32 on a driver seat side, and the other pair of guide rails 31 and 32 on a passenger seat side are arranged diagonally in a symmetrical manner with respect to the axis of the screw shaft 21. More specifically, the pairs of guide rails 31 and 32 are arranged so that a distance between the guide rails 31, 31 becomes wider as the guide rails 31, 31 extend towards a front side of the vehicle (refer to FIG. 4). As shown in FIG. 6, each of the guide rails 31, 31 extends adjacently to the screw shaft 21 and is stored together with the screw shaft 21 in a first storage space 53 of the storage space 13. The first storage space 53 extends behind the interior rearview mirror 15 (the attaching portion 15b) when viewed from the driver/passenger view point. Since the pair of sun visor bodies 12, 12 and related mechanisms for supporting them are identical, the explanation hereunder is made only by referring to the sun visor body 12 and the related mechanism for supporting the same that are positioned on the driver seat side.

As shown in FIGS. 3 and 6, the guide rail 31 arranged adjacent to the screw shaft 21 includes a first guide groove 33, a second guide groove 34 and a rack gear 35. The first guide groove 33 is recessedly provided on a side surface of the guide rail 31, the side surface facing the guide rail 32, and extends in a longitudinal direction of the guide rail 31. The second guide groove 34 recessedly provided on the guide rail 31 extends along the first guide groove 33. A depth of the second guide groove 34 is deeper than that of the first guide groove 33 and an opening of the second guide groove 34 is smaller in a vertical direction thereof than that of the first guide groove 33. The rack gear 35 is provided on a lower portion of the side surface of the guide rail 31, the side surface facing the guide rail 32, and extends in a longitudinal direction of the guide rail 31. A front end portion of the second guide groove 34 in the longitudinal direction of the vehicle is smoothly bent downward and forms a cam portion 34a.

As shown in FIG. 3, the guide rail 32 arranged away from the screw shaft 21 includes a guide groove 32a that is recessedly provided on a side surface thereof, the side surface facing the guide rail 31, and that extends in the longitudinal direction of the guide rail 32. The guide rail 32 also includes a rack gear 36 that is provided on a lower portion of the side surface thereof, the side surface facing the guide rail 31, and that extends in the longitudinal direction of the guide rail 32. The guide groove 32 is identical to the second guide groove 34 in its shape except for the cam portion 34a.

A slider 37 made of metal plate is slidably attached to the guide rail 31 in the longitudinal direction thereof and includes an attaching portion 37a protruding in a direction of the nut member 22. One end of a connecting link 38 is pivotally connected to the attaching portion 37a, and the other end of the connecting link 38 is pivotally connected to an attaching portion 22a formed on the nut member 22. Consequently, as the nut member 22 moves along the screw shaft 21 in the longitudinal direction of the vehicle, the slider 37 connected to the nut member 22 via the connecting link 38 moves along the guide rail 31 in the longitudinal direction of the vehicle. At this time, distance between the nut member 22 and the slider 37 changes as the nut member 22 longitudinally moves. The change in the distance is absorbed by the connecting link 38, thereby allowing the nut member 22 and the slider 37 to move.

Figure 9:
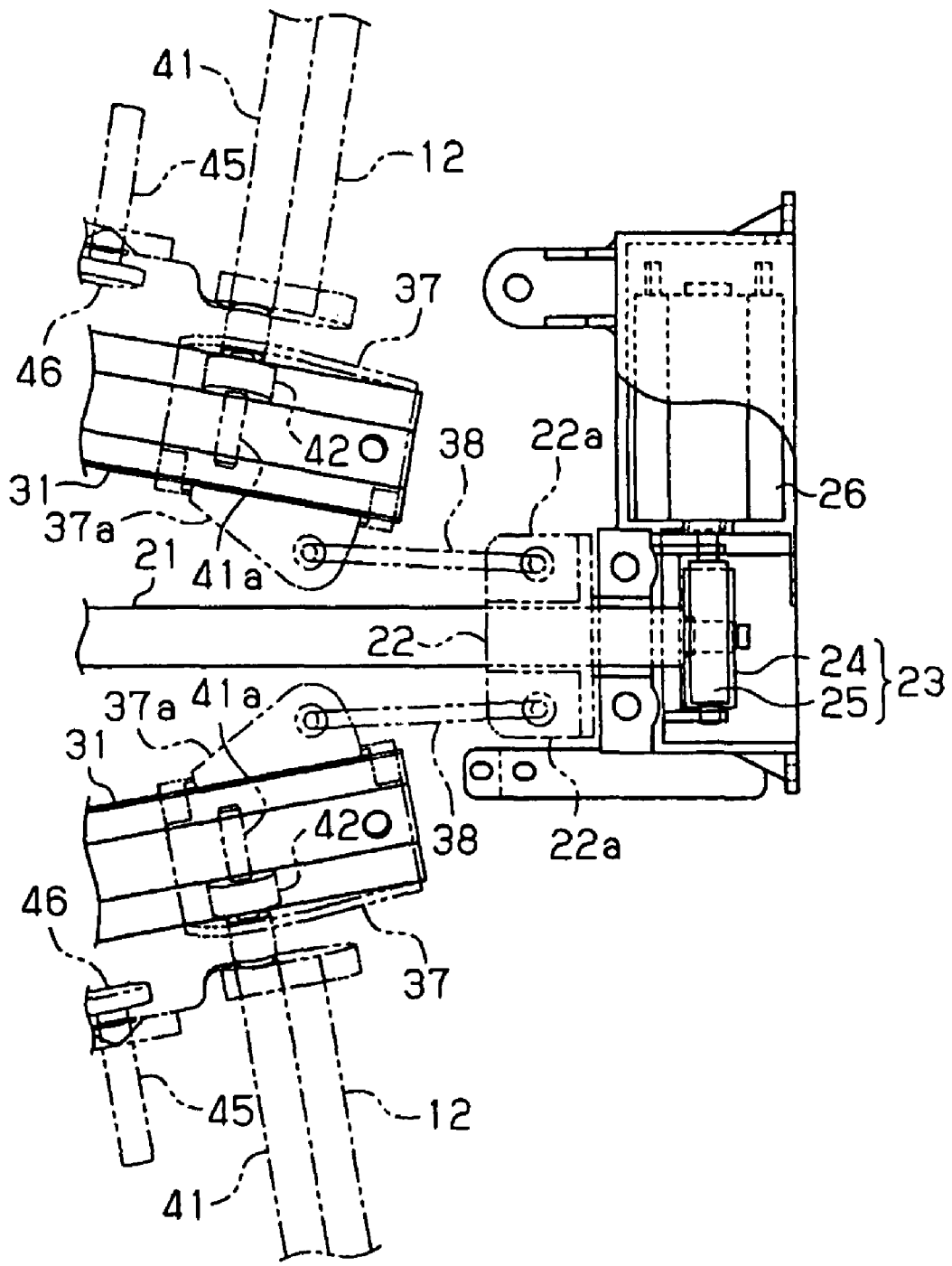
FIG. 9 is an enlarged view of FIG. 4.
Figure 10:
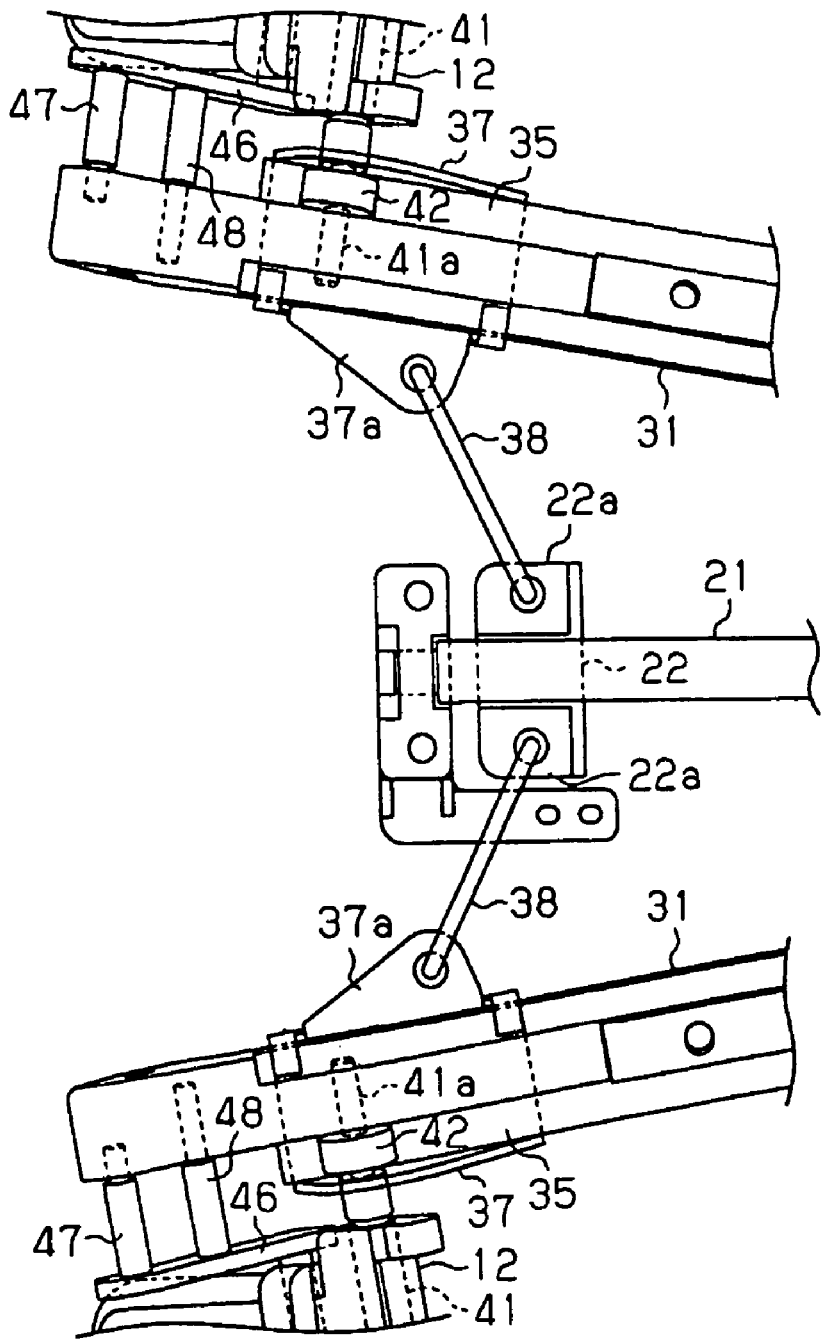
FIG. 10 is an enlarged view of FIG. 4.

As shown in FIG. 9, when the nut member 22 is positioned at the rear end of the screw shaft 21, the nut member 22 and each of the sliders 37, 37 are connected by each of the connecting links 38, 38 that are arranged substantially parallel to each other, and thus the nut member 22 and the sliders 37, 37 move together. As shown in FIG. 10, as the nut member 22 moves forward to be positioned at the front end of the screw shaft 21, the connecting links 38, 38 come to be arranged in a manner that the one end of each connecting link 38 is positioned farther from the axis of the screw shaft 22 than the other end of each link 38 is positioned, allowing the nut member 22 and the sliders 37, 37 to move together. The nut member 22 and the screw shaft 21, which are connected to the sliders 37, 37 via the connecting links 38, 38, make up a movement mechanism 20.

As shown in FIGS. 3 and 4, a torque rod 41 shaped in a round bar is inserted into the rear end of the sun visor body 12 along a whole length of the sun visor body 12 so as to extend in a width direction of the vehicle. A pin 41a is provided on one end of the torque rod 41 so as to protrude outward with respect to a width direction of the torque rod 41 and to face the guide rail 31. The pin 41a is inserted into the slider 37 and then into the second guide groove 34 so as to move with the slider 37 that slides along the guide rail 31. Also, the pin 41a supports a pinion 42 meshing with the rack gear 35. A pin 41b is provided on the other end of the torque rod 41 so as to face the guide rail 32 and to protrude outward with respect to the width direction the vehicle. The pin 41b is inserted into the guide groove 32a and supports a pinion 43 meshing with the rack gear 36. Consequently, when the slider 37 slides along the guide rail 31 in the longitudinal direction thereof, the pins 41a and 41b (the torque rod 41) moves along the guide grooves 34 and 32a respectively, thereby the sun visor body 12 moves along the guide rails 31 and 32 in the longitudinal direction thereof while the pinions 42 and 43, each supported by the pins 41a and 41b respectively, roll along the rack gears 35 and 36 respectively.

As shown in FIG. 6, a pin 45 is provided in an intermediate portion of the sun visor body 12 in the longitudinal direction thereof so as to protrude outward with respect to a width direction of the sun visor body 12 and to face the guide rail 31. A rear end portion of a link 46 made of, for example, metal plate is pivotally connected to the pin 45. A first engagement pin 47 is protrudingly provided on a front portion of the link 46 in the longitudinal direction of the vehicle and inserted into the first guide groove 33, and a second engagement pin 48 is protrudingly provided in an intermediate portion of the link 46 in a longitudinal direction thereof and inserted into the second guide groove 34. Diameters and axial lengths of the first engagement pin 47 and the second engagement pin 48 are set so that the first engagement pin 47 fits only into the first guide groove 33 and the second engagement pin 48 fits only into the second guide groove 34. It is set so that the second engagement pin 48 reaches a front end of the second guide groove 34 (the cam portion 34a) when the first engagement pin 47 reaches a front end of the first guide groove 33. Consequently, when the link 46 is positioned in a rear portion of the guide rail 31, the link 46 is positioned in a manner that a longitudinal direction thereof (a direction of a line connecting the pin 45, the first engagement pin 47 and the second engagement pin 48) coincides with the longitudinal direction of the guide rail 31. When the link 46 is positioned in a front portion of the guide rail 31, the link 46 is positioned in a manner that the longitudinal direction thereof is inclined. More specifically, the rear end portion of the link 46 is inclined obliquely downward by pivoting about the first engagement pin 47 because the second engagement pin 48 is guided by the cam portion 34a formed in the front end portion of the second guide groove 34. At this time, the sun visor body 12 connected to the link 46 via the pin 45 is positioned in a manner that a front end portion of the sun visor body 12 is inclined obliquely downward by pivoting about the torque rod 41 (the pins 41a and 41b).

Figure 7:
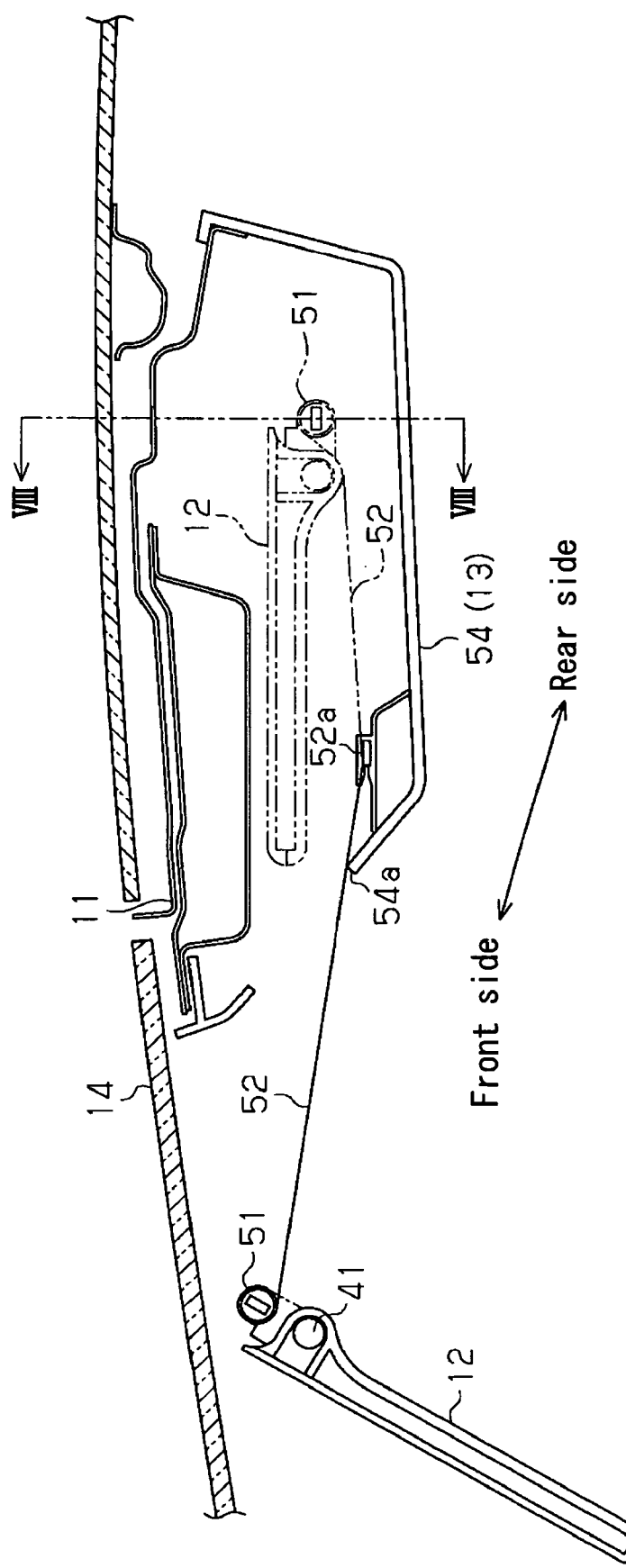
FIG. 7 is a cross-sectional view taken on line VII-VII of FIG. 4.
Figure 8:
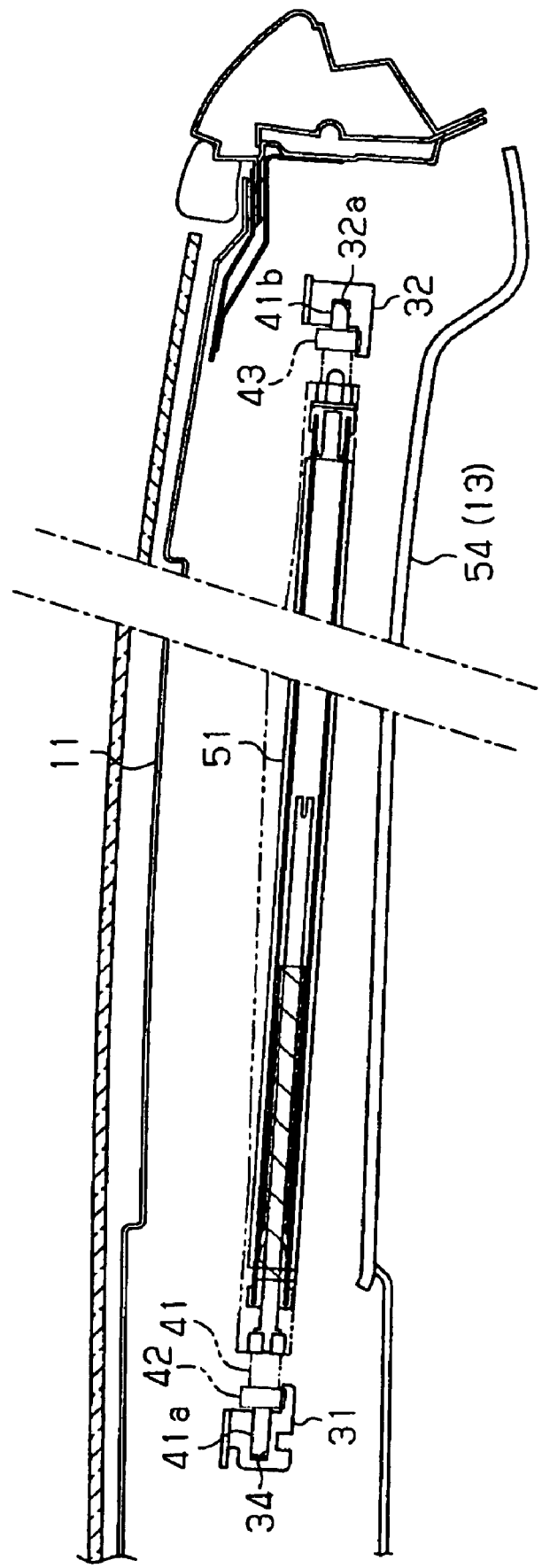
FIG. 8 is a cross-sectional view taken on line VIII-VIII of FIG. 4.

A retractor 51, serving as a retracting member, is integrally provided to the rear end of the sun visor body 12 and extends in the width direction of the vehicle along the whole length of the sun visor body 12. The retractor has a roller for retracting and deploying the shade. A shade 52 wound on the retractor 51 is deployed from and retracted in the retractor 51. The shade 52 is preferably made of a cloth. As shown in FIG. 7, the storage space 13 includes a second storage space 54 that allows the sun visor body 12 to be stored behind the windshield 14 when viewed from the driver/passenger view point. An edge 52a of the shade 52 is fixed to an interior of the second storage space 54 (the molded ceiling) near an ingress/egress portion 54a opening forward in the longitudinal direction of the vehicle for allowing the sun visor body 12 to ingress and egress. While the sun visor body 12 that has been deployed forward is coming to be stored in the second storage space 54 (the storage space 13), the shade 52 is retracted into the retractor 51 as a distance between the retractor 51 and the edge 52a decreases until the retractor 51 approaches a position of the edge 52a. Then, while the retractor 51 is moving away from the position of the edge 52a as the sun visor body 12 further moves rearward of the vehicle, the shade 52 is deployed from the retractor 51 as the distance between the retractor 51 and the edge 52a increases. That is, the shade 52 is deployed from the retractor 51 in a manner that one side of the shade 52 facing upward when the retractor 51 moves between the first position and the position of the edge 52a faces downward when the retractor 51 moves between the position of the edge 52a to the second position in accordance with a storage/deployment action of the sun visor body 12, i.e. a movement of the sun visor body 12 between the first position and the second position. As a result, a length of the shade 52 to be deployed and retracted is reduced, in other words, the length of the shade 52 necessary for the storage/deployment action of the sun visor body 12 is reduced.

Next, the movement of the sun visor apparatus according to the embodiment is summarized. When the sun visor body 12 is in the first position located in the storage space 13 (the second storage space 54) as shown in two-dot chain lines in the corresponding drawings and the screw shaft 21 is driven or actuated by the electric motor 26 to rotate in one direction, the nut member 22 threaded onto the screw shaft 21 moves forward in the longitudinal direction of the vehicle along the axis of the screw shaft 21, thereby causing the slider 37 connected to the screw shaft 21 via the connecting link 38 to slide forward along the corresponding guide rails 31.

When the slider 37 slides forward along the guide rail 31, the sun visor body 12 connected to the slider 37 via the torque rod 41 moves forward while the pinions 42 and 43 roll on the rack gears 35 and 36, respectively. When the second engagement pin 48 protrudingly provided on the link 46 approaches the cam portion 34a of the second guide rail 34, the sun visor body 12 is inclined obliquely downward by pivoting about the torque rod 41 (pins 41a and 41b). Then, as shown in full lines in the corresponding drawings, the sun visor body 12 finishes moving to the second position where the rear end of the sun visor body 12 is positioned behind the interior rearview mirror 15 (the mirror body 15a) when viewed from the driver/passenger view point. Here, when the sun visor body 12 moves forward in the longitudinal direction of the vehicle, the shade 52 is deployed from the retractor 51. In this way, the shade 52 provides shading to the driver/passenger by covering the windshield 14 from an interior of the vehicle between the sun visor body 12 and the storage space 13. More specifically, the shade 52 provides shading to an opening between the rear end of the sun visor body 12 (the retractor 51) and the ingress/egress portion 54a of the second storage space 54.

When the sun visor body 12 has moved forward, i.e., the sun visor body 12 is in the second position and the screw shaft 21 is driven by the electric motor 26 to rotate in the other direction, the sun visor body 12 moves rearward in the longitudinal direction of the vehicle in response to the rotation direction of the screw shaft 21 and comes to be stored in the storage space 13 (the second storage space 54).

Figure 11:
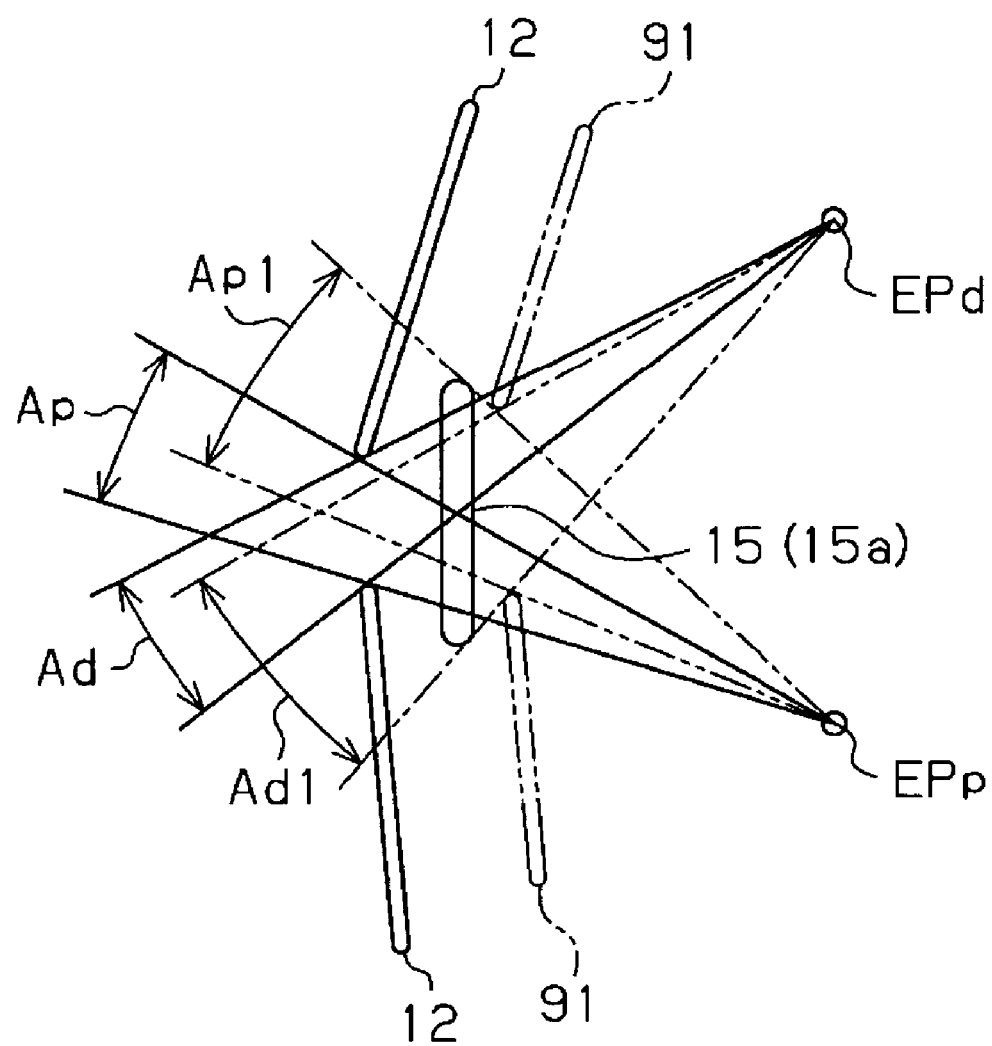
FIG. 11 is a diagram showing shaded areas provided by the sun visor apparatus according to the embodiment of the present invention and areas proved by a sun visor apparatus according to a known invention.

According to the embodiment, the rear ends of the sun visor bodies 12, 12 are positioned behind the interior rearview mirror 15 (the mirror body 15a) when viewed from the driver/passenger view point when the sun visor bodies 12, 12 are deployed forward. Therefore, as shown in FIG. 11, the sun visor bodies 12, 12 are maximized in size in the lateral direction of the vehicle to an extent that the sun visor bodies 12, 12 do not interfere with the interior rearview mirror 15 when moving forward or rearward in the longitudinal direction of the vehicle. In FIG. 11, EPd corresponds to the driver view point and EPp corresponds to the passenger view point. Ad and Ap correspond to non-shaded areas by the sun visor bodies 12, 12. Ad1 and Ap1 correspond to non-shaded areas by sun visor bodies 91, 91 of known sun visor apparatus that are positioned in front of the review mirror 15 (the mirror body 15a) when viewed from the driver/passenger view point. As shown in FIG. 11, Ad and Ap are reduced compared to Ad1 and Ap1, respectively. That is, when viewed from the driver view point EPd and the passenger view point EPp, areas shaded by the sun visor bodies 12, 12 are increased according to the embodiment.

As described above, the following effects are obtained according to the embodiment. According to the embodiment, the rear ends of the sun visor bodies 12, 12 are positioned behind the interior rearview mirror 15 (the mirror body 15a) when viewed from the driver/passenger view point, that is, the sun visor bodies 12, 12 are positioned farther from the driver than the interior rearview mirror 15 (the mirror body 15a) is positioned. Consequently, the sun visor bodies 12, 12 do not block the interior rearview mirror 15 (the mirror body 15a) when viewed by a driver, thereby allowing the sun visor bodies 12, 12 to be maximized in size in the lateral direction of the vehicle to the extent that the sun visor bodies 12, 12 do not interfere with the interior rearview mirror 15 when moving forward or rearward in the longitudinal direction of the vehicle. As a result, in terms of both on the driver seat side and the passenger seat side, the areas shaded by the sun visor bodies 12, 12 are increased.

In addition, the shade 52 is deployed from the retractor 51 to extend from the rear end of the sun visor body 12 (the retractor 51) to the opening 54a of the second storage space 54, thereby blocking sunlight through the windshield 14 between the rear end of the sun visor body 12 and the opening 54a of the second storage space 54 when the sun visor body 12 is moved forward (the second position).

Further, the sun visor bodies 12, 12 are positioned farther from the driver view point EPd and the passenger view point EPp compared to the sun visor bodies 91, 91 of the known sun visor apparatus, thereby giving less oppressing feeling to the driver and/or the passenger.

According to the embodiment, in the course of the movement of the sun visor body 12 between the first position and the second position, the distance between the retractor 51 and the edge 52a is shortest, that means, a length of the shade 52 deployed from the retractor 51 is shortest when the sun visor body 12 is positioned in an intermediate portion between the first position and the second position in the longitudinal direction of the vehicle (hereinafter referred to as "the intermediate portion between the first position and the second position). That is, the shade 52 is deployed from the retractor 51 when the sun visor body 12 moves from the intermediate portion between the first position and the second position to the first position, and when the sun visor body 12 moves from the intermediate portion between the first position and the second position to the second position, respectively. As a result, the length of the shade 52 to be deployed or retracted is reduced, in other words, the length of the shade 52 necessary for the movement of the sun visor 12 is reduced.

Because the retractor 51 is fixedly provided to the sun visor 12 according to the embodiment, only the edge 52a of the shade 52 needs to be fixed to the second storage space 54 (the storage space 13). Consequently, less volumetric capacity is needed for a ceiling space (the second storage space 54) comparing to when, for example, the retractor 51 is fixed to the second storage space 54, thereby preventing the ceiling space and a space above an occupant (so-called a head clearance) from reduced.

According to the embodiment, the electric motor 26 actuates the movement mechanism 20 via the worm gear set 23 and the sun visor body 12 is automatically moved between the first position and the second position, and thus the sun visor body 12 is stored and deployed.

According to the embodiment, the pair of sun visor bodies 12, 12 positioned on the driver seat side and on the passenger seat side is interlockingly moved by one movement mechanism and one electric motor, i.e., the movement mechanism 20 and the electric motor 26, thereby controlling the increment of the number of parts required for actuation.

According to the embodiment, the slider 37 serving as a support portion, which is attached to the guide rail 31 and supporting the sun visor body 12, is connected to the nut member 22 via the connecting link 38. Consequently, the change in the distance between the nut member 22 and the slider 37 is absorbed by the connecting link 38, even though a direction of the movement of the sun visor body 12, i.e., the movement of the slider 37, is diagonal with respect to the longitudinal direction of the vehicle along which the screw shaft 21 extends. Thus, the sun visor body 12 (the slider 37) moves in accordance with a movement of the nut member 22.

According to the embodiment, the sun visor body 12 lies within the second storage space 54 and is not exposed outside when stored, resulting in improved appearance. Further, according to the embodiment, the cam portion 34 into which the second engagement pin 48 is inserted allows the sun visor body 12 to be inclined at an appropriate angle for providing shading as the sun visor body 12 moves forward in the longitudinal direction of the vehicle (the second position).

Variations and changes may be made to the embodiment as follows. In the embodiment, the nut member 22 and the slider 37 may be connected directly without including the connecting link 38 between the nut member 22 and the slider 37 when the direction of the movement of the nut member 22 and the direction of movement of the slider 37 (the sun visor body 12) are parallel to each other.

In the embodiment, the movement mechanism 20 and the electric motor 26 may be provided to each of the sun visor bodies 12, 12. In this case, the sun visor bodies 12, 12 positioned on the drivers seat side and on the passenger seat side are operated separately from each other.

In the embodiment, the movement mechanism 20 and the electric motor 26 may be omitted, and the sun visor body 12 may be manually moved between the first position and the second position. In this case, an appropriate manipulating knob exposed from the second storage space 54 may be provided to the sun visor body 12 so that the sun visor body 12 stored in the second storage space 54 is movable manually.

In the embodiment, the edge 52a of the shade 52 may be fixed or fastened to an inside of the roof panel 11 (a body panel). Or, the edge 52a may be structured so as to be detachable either to the second storage space 54 (the molded ceiling) or to the roof panel 11 (the body panel).

In the embodiment, the edge 52a of the shade 52 may be fixed either to the second storage space 54 or to the roof panel 11 (the body panel) in a position that corresponds to a front or a rear portion of the second storage space 54. Further, in the embodiment, the retractor 51 may be fixedly provided on an inside of the second storage space 54 or of the roof panel 11 (the body panel), while the edge 52a of the shade 52 may be fixed to the rear portion of the sun visor body 12. In this case, the retractor 51 is preferably fixed to the second storage space 54 or to the roof panel 11 in a position that corresponds to the intermediate portion between the first position and the second position in the longitudinal direction of the vehicle. However, the retractor 51 may be fixed to the second storage space 54 or to the roof panel 11 in the position that corresponds to the front portion or the rear portion of the second storage space 54.

In the embodiment, the sun visor body 12 may be provided with an appropriate hinge pin so as to be inclined manually without including the link 46 and so forth.

In the embodiment, the slider 37 may be moved forward and rearward in the longitudinal direction of the vehicle by a drive belt, a push-pull cable or the like driven by an appropriate drive member.

According to the embodiment, the sun visor body 12 is supported by the guide rails 31 and 32 so that the end portion thereof is positioned behind the interior rearview mirror 15 attached to the windshield 14, or for example, to a roof inner panel, a dashboard or the like when viewed from the driver/passenger view point, that is, the sun visor body 12 is positioned farther from the driver than the interior rearview mirror 15 is positioned (the second position). Consequently, the sun visor body 12 does not block the interior rearview mirror 15 (the mirror body 15a) when viewed by the driver, thereby allowing the sun visor body 12 to be maximized in size in the lateral direction of the vehicle to the extent that the sun visor body 12 does not interfere with the interior rearview mirror 15 when moving forward or rearward in the longitudinal direction of the vehicle. As a result, in terms of both on the driver seat side and on the passenger seat side, the areas shaded by the sun visor bodies 12, 12 are increased.

The sun visor apparatus for the vehicle according to the embodiment further includes the retractor 51 retracting and deploying the shade 52 for storing and extending the shade 52.

With a structure of the sun visor apparatus for the vehicle according to the embodiment, the shade 52 covers the windshield 14 from the interior of the vehicle between the sun visor body 12 and the storage space 13 when the rear end of the sun visor body 12 is positioned in the second position.

Consequently, the shade 52 is deployed from the retractor 51 to extend from the sun visor body 12 to the storage space 13, thereby blocking sunlight through the windshield 14 between the sun visor body 12 and the storage space 13 when the sun visor body 12 is moved forward (the second position).

With the structure of the sun visor apparatus for the vehicle according to the embodiment, one of the retractor 51 and the edge 52a of the shade 52 is fixed to the sun visor body 12, and the other one of the retractor 51 and the edge 52a of the shade 52 is fixed to the roof panel 11 or to the storage space 13 in the intermediate portion between the first position and the second position in the longitudinal direction of the vehicle.

Consequently, in the course of the movement of the sun visor body 12 between the first position and the second position, the distance between the retractor 51 and the edge 52a is shortest, that means, the length of the shade 52 deployed from the retractor 51 is shortest when the sun visor body 12 is located in the intermediate portion between the first position and the second position. That is, the shade 52 is deployed from the retractor 51 when the sun visor body 12 moves from the intermediate portion between the first position and the second position to the first position, and when the sun visor body 12 moves from the intermediate portion between the first position and the second position to the second position, respectively. As a result, the length of the shade 52 to be deployed or retracted is reduced, in other words, the length of the shade 52 necessary for the movement of the sun visor 12 is reduced.

With the structure of the sun visor apparatus for the vehicle according to the embodiment, the retractor 51 is fixed to the sun visor body 12 and the edge 52a of the shade 52 is fixed to the roof panel 11 or to the storage space 13.

Consequently, only the edge 52a of the shade 52 needs to be fixed to the roof panel 11 or to the storage space 13, and thus less volumetric capacity is needed for the ceiling space (under the roof panel 11 or in the storage space 13) comparing to when, for example, the retractor 51 is fixed to the roof panel 11 or to the storage space 13, thereby preventing the ceiling space and the space above an occupant (so-called the head clearance) from reduced.

The sun visor apparatus for the vehicle according to the embodiment further includes the movement mechanism 20 moving the sun visor body 12 along the guide rails 31 and 32 in the longitudinal direction of the vehicle, and the electric motor 26 driving the movement mechanism 20.

Consequently, the electric motor 26 drives the movement mechanism 20 and the sun visor body 12 is automatically moved between the first position and the second position.

The sun visor apparatus for the vehicle according to the embodiment, the movement mechanism 20 and the electric motor 26 interlockingly move the sun visor body 12 provided on the driver seat side and move the sun visor body 12 provide on the passenger seat side.

Consequently, the sun visor bodies 12, 12 positioned on the driver seat side and on the passenger seat side respectively are moved by the movement mechanism 20 and the electric motor 26. In other words, only one movement mechanism and one electric motor are required, thereby controlling the increment of the number of parts required for actuation.

The sun visor apparatus for the vehicle according to the embodiment, the movement mechanism 20 includes the screw shaft 21 rotatably connected to the roof panel 11, extending in the longitudinal direction of the vehicle and driven by the electric motor 26 for rotation, the nut member 22 threaded onto the screw shaft 21, and the connecting link 38 one end thereof is rotatably connected to the slider 37 and the other one end thereof is rotatably connected to the nut member 22.

Consequently, the change in the distance between the nut member 22 and the slider 37 is absorbed by the connecting link 38, even though the direction of the movement of the sun visor body 12 (the slider 37) is diagonal with respect to the longitudinal direction of the vehicle along which the screw shaft 21 extends. Thus, the sun visor body 12 (the slider 37) moves in accordance with the movement of the nut member 22.

The sun visor apparatus for the vehicle according to the embodiment increases the areas shaded by sun visor bodies 12, 12 without blocking the interior rearview mirror 15 when viewed by the driver viewpoint.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A sun visor apparatus for a vehicle, comprising:
a driver-side sun visor body provided on a driver seat side;
a passenger-side sun visor body provided on a passenger seat side;
supporting members supported on a roof panel and supporting each of the sun visor bodies so that the sun visor bodies move in a longitudinal direction of the vehicle between a first position where the sun visor bodies are positioned in a respective storage space provided on an underside of the roof panel and a second position where a respective rear end of each of the sun visor bodies is positioned behind a mirror body of an interior rearview mirror when viewed from a rear of the vehicle;
a respective shade extending from each of the sun visor bodies to the respective storage space in accordance with a respective movement of the sun visor bodies;
a movement mechanism moving the sun visor bodies along the supporting members in the longitudinal direction of the vehicle; and
a drive member driving the movement mechanism, wherein the movement mechanism and the drive member interlockingly move the driver-side sun visor body and the passenger-side sun visor body.

2. The sun visor apparatus for the vehicle according to claim 1, wherein the movement mechanism includes a screw shaft rotatably connected to the roof panel, extending in the longitudinal direction of the vehicle and driven by the drive member for rotation, a nut member threaded onto the screw shaft, and a connecting link one end thereof is rotatably connected to a support portion and the other one end thereof is rotatably connected to the nut member.

3. The sun visor apparatus for the vehicle according to claim 1, wherein each of the supporting members comprises a pair of supporting member portions, provided on respective right and left sides of each of the sun visor bodies in a width direction of the vehicle.

* * * * *